R. H. SLIFER
Cultivators.
No. 198,698.  Patented Dec. 25, 1877.
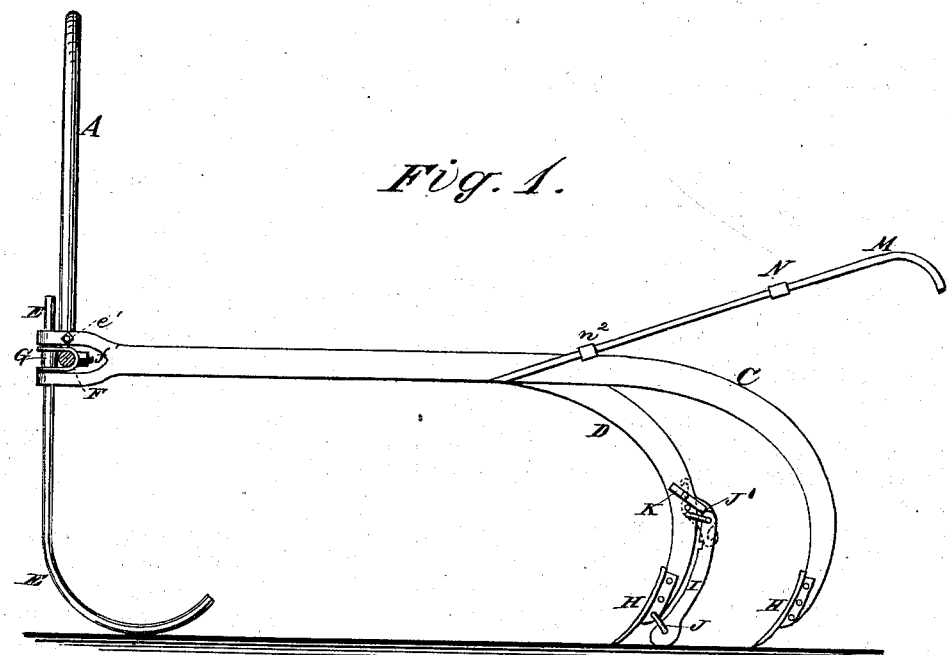
Fig. 1.
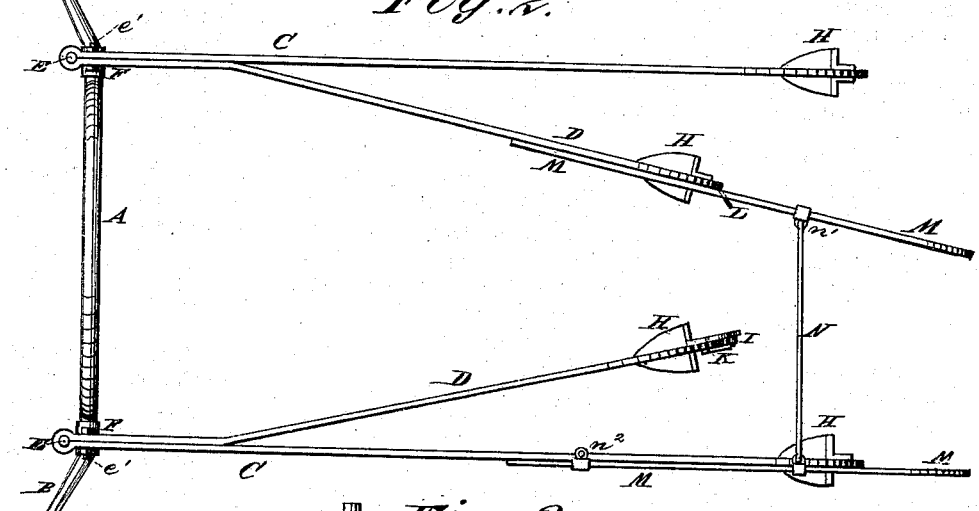
Fig. 2.
Fig. 3.
WITNESSES:
H. Rydquist
J. H. Scarborough
INVENTOR:
R. H. Slifer
BY
ATTORNEYS.

UNITED STATES PATENT OFFICE.

REUBEN H. SLIFER, OF HOLDEN, MISSOURI.

IMPROVEMENT IN CULTIVATORS.

Specification forming part of Letters Patent No. 198,698, dated December 25, 1877; application filed May 12, 1877.

*To all whom it may concern:*

Be it known that I, REUBEN HENRY SLIFER, of Holden, in the county of Johnson and State of Missouri, have invented a new and useful Improvement in Cultivators, of which the following is a specification:

Figure 1 is a side view of my improved cultivator, the near draft-arm being cut off. Fig. 2 is a top view of the same. Fig. 3 is a detail view, showing the connection between the beam, arched bar, pivot-runner, and clip.

Similar letters of reference indicate corresponding parts.

The object of this invention is to furnish an improved cultivator which shall be so constructed that the whiffletrees cannot drop to the ground to injure or break down the plants; that it may be adjusted to work at any desired depth in the ground; that the plow-beams may have sufficient play to be properly guided; and that it may be so adjusted as to be drawn from place to place without the plow-points coming in contact with the ground, and which shall be simple in construction and convenient in use.

The invention will first be described in connection with the drawing, and then pointed out in the claims.

A is an arched connecting-bar, the end parts B of which project horizontally, incline forward, and have small rigid hooks $b'$ formed upon their ends to receive the whiffletrees, the forward inclination of the arms B carrying the whiffletrees so far forward that the forward ends of the plow-beams will not interfere with the play of said whiffletrees.

The plow-beams are made in pairs, and of a bar of iron placed edgewise, which bar is bent together to form an eye to receive the rods E, and their end parts are curved downward to serve as standards to receive the plows. The lower parts of the rods E are curved to the rearward, to adapt them to support the forward end of the machine from dropping to the ground, and to serve as runners to carry the forward end of the machine when passing from place to place.

The rods E should be so adjusted that their curved lower ends may be near the surface of the ground when the plows are working at the desired depth. The curved rods E are secured in place, when adjusted, by set-screws $e'$, passing through the folded-together parts of the plow-beams, so as to draw said parts together and clamp the said rods.

The folded-forward ends of the plow-beams are slitted or forked horizontally to receive the arms B and the clips F, which pass around the said arms, and have holes through their ends, through which the rods E pass.

The ends of the clips F are kept from being pressed together by tubular washers G, placed between them, and through which the rods E pass.

The vertical movement of the rear ends of the plow-beams is limited by pins, screws, or bolts $f'$, screwed into or otherwise attached to the arms B, and which pass through short vertical slots in the clips F. The screws or bolts are provided with nuts, so that by screwing up the said nuts the vertical movement of the rear ends of the plow-beams may be prevented.

H H are the plows, upon the rear sides of which are formed two parallel flanges at such a distance apart as to receive the lower ends of the beams or standards between them, and through which and the said beams or standards are formed holes to receive the bolts and pins by which the plows are secured in place. The upper pins should be made of such a strength as to hold the plow to its place under ordinary circumstances, but so as to break should the plows strike an obstruction, and allow the plows to turn back, so as to prevent breakage.

I is a bar having a shoe formed upon its lower end, and which is so shaped as to fit against the rear edge of the lower part of one of the inner beams D. The bar I is connected with the plow beam or standard D by two links or short bars, J J', pivoted to the said beam or standard and to the said bar I.

By this construction the bar I may be moved downward, so that its lower end may project below the point of the plow, to prevent said point from coming in contact with the ground while drawing the machine from place to place. The bar I may also be adjusted with its lower end or shoe upon a level with the point of the plow H, so as to serve as a landside or foot to give steadiness of motion to the plow; or the bar I may be raised, so as to be out of contact with the ground.

The bar I may be locked in place when pushed down into either of its lower positions by a button, K, pivoted to the beam or standard D in such a position that its end may be turned down against the upper end of the said bar I.

The ends of the upper inner bar J' have hooks formed upon them to receive a hook-pin, L, attached to the other inner beam, D, so that the bar I may be lowered by inserting the hook-pin L into the forward hook of the bar J', and raising it until the said hook-pin L can pass and catch upon the rear edge of the standard or beam D; or the hook-pin L may be passed through the rear hook of the bar J', and pushed down until it can pass through a notch in the inner edge of the said bar and catch upon its inner edge. In this way the bar I may be lowered and all the beams connected in such a way as to ride upon and be supported by the said bar I without stopping the team or taking the hands from the plow-handles.

The plows are again placed in working position by raising the pin L and withdrawing it, and the bar I will be pushed up by the pressure of the ground.

M M are the handles, one of which is attached to the outer beam C of one pair of beams, and the other to the inner beam of the other pair. The handles are inclined to one side, so that the plowman can grasp both handles while walking at the side of the row of plants being cultivated. N is a rod, pivoted at one end to one of the handles M, and having a hook formed upon its other end, to be hooked into an eye, $n^1$, attached to the other handle M, when the two parts of the cultivator are to be connected together, and hooked into an eye, $n^2$, attached to the handle M, to which said hook-rod is pivoted, when the two parts of the cultivator are not required to be connected together.

The bent arms and draft-hooks are prevented from rising higher than the beams by means of the relative arrangement of the stop-pins and slots in the clips, which gives practically increased length of beam, so far as it is affected by the draft, and sufficient clearance for the team, without increasing the distance between the team and the plows proper, or, in other words, allows the beams to be made shorter than in other plows of its class. The adjustable runners serve the purpose of coupling-pins or pivots, and their vertical adjustability for different lengths of shovels and for different depths of plowing, thus securing efficiency with a minimum number of parts.

The relations of the various parts and the adjustment to secure easy control of the cultivator give practical value to my invention. The beams are set level with each other, and the shoe with the points of the plows, the latter being connected by rod, so as to make the whole run evenly, with the least possible draft and with the greatest convenience to workman.

Having thus described my invention, I claim as new and desire to secure by Letters Patent—

1. The combination of arch A, having horizontal ends B B, bent forward and provided with pins $f'$, the slotted clips F, tubular washers G, adjustable runners E, and the double beams C D, having clamp-bolts $e'$, substantially as shown and described.

2. The combination of the bar I, having a shoe formed upon its lower end and a notch in its forward edge, the connecting bar or link J, the connecting-bar J', having a hook formed upon each end, the hook-pin L, and the locking-button K, with the inner plow-beams D, substantially as herein shown and described.

REUBEN H. SLIFER.

Witnesses:
    J. H. ORMSBY,
    J. E. CLARK.